(12) United States Patent  
Shiina et al.

(10) Patent No.: US 9,479,054 B2  
(45) Date of Patent: Oct. 25, 2016

(54) BUCK CONVERTER WITH REVERSE CURRENT DETECTION AND PSEUDO RIPPLE GENERATION

(71) Applicant: Seiko Instruments Inc., Chiba-shi, Chiba (JP)

(72) Inventors: Yoshiomi Shiina, Chiba (JP); Masayuki Uno, Ina (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 22 days.

(21) Appl. No.: 14/643,846

(22) Filed: Mar. 10, 2015

(65) Prior Publication Data

US 2015/0263623 A1     Sep. 17, 2015

(30) Foreign Application Priority Data

Mar. 11, 2014 (JP) ................ 2014-047940  
Dec. 12, 2014 (JP) ................ 2014-252297

(51) Int. Cl.

| | | |
|---|---|---|
| *H02M 3/158* | (2006.01) | |
| *H02M 3/156* | (2006.01) | |
| *H02M 1/15* | (2006.01) | |
| *H02M 1/00* | (2006.01) | |

(52) U.S. Cl.  
CPC ........... *H02M 3/158* (2013.01); *H02M 3/1563* (2013.01); *H02M 1/15* (2013.01); *H02M 2001/0032* (2013.01); *Y02B 70/16* (2013.01)

(58) Field of Classification Search  
CPC ............ H02M 3/156–3/1588; Y02B 70/1466  
USPC .......................... 323/282–285, 288  
See application file for complete search history.

(56) References Cited

U.S. PATENT DOCUMENTS

2012/0274300 A1*  11/2012  Nakashima ........... H02M 3/156  
                                                                        323/284  
2014/0028270 A1*   1/2014  Miyazaki ................. G05F 1/10  
                                                                        323/271

FOREIGN PATENT DOCUMENTS

JP         2011-182533 A    9/2011

* cited by examiner

*Primary Examiner* — Harry Behm  
*Assistant Examiner* — Peter Novak  
(74) *Attorney, Agent, or Firm* — Brinks Gilson & Lione

(57) ABSTRACT

Provided is a DC/DC converter capable of immediately resuming to a normal operation from a state in which an output transistor is continued to be turned off when a reverse current is generated in a light load state. The DC/DC converter includes an ON-timer circuit including: a ripple generation circuit; a smoothing circuit; a timer circuit configured to output an ON-time signal; a logic circuit configured to detect a sign of generation of a reverse current; and a switch circuit configured to, based on a detection signal of the logic circuit, maintain an output voltage of the ripple generation circuit or control the output voltage of the ripple generation circuit to a predetermined voltage.

5 Claims, 9 Drawing Sheets

BUCK CONVERTER WITH REVERSE CURRENT DETECTION AND PSEUDO RIPPLE GENERATION

RELATED APPLICATIONS

This application claims priority under 35 U.S.C. §119 to Japanese Patent Application Nos. 2014-047940 filed on Mar. 11, 2014 and 2014-252297 filed on Dec. 12, 2014, the entire contents of which are hereby incorporated by reference.

BACKGROUND OF THE INVENTION

1. Field of the Invention

The present invention relates to a DC/DC converter configured to convert a DC voltage, and more particularly, to a DC/DC converter including a timer circuit.

2. Description of the Related Art

A related-art DC/DC converter is now described. FIG. 11 is a circuit diagram illustrating the related-art DC/DC converter.

The related-art DC/DC converter includes a comparator 504, an RS-FF circuit 113, a drive circuit 110, a reference voltage generation circuit 503, a timer circuit 501, an NMOS transistor 108 and an NMOS transistor 109, which are output transistors, a capacitor 107, a coil 106, resistors 103, 104, and 502, a ground terminal 100, an output terminal 102, and a power supply terminal 101.

The comparator 504 has an inverting input terminal for inputting a divided voltage VFB obtained by dividing an output voltage Vout of the output terminal 102 and a non-inverting input terminal for inputting a reference voltage obtained by adding a ripple voltage, which depends on a power supply voltage and the output voltage Vout, and a slope voltage, which changes with a predetermined slope, to each other. The comparator 504 outputs a signal corresponding to the result of comparison. When the divided voltage VFB is higher than the reference voltage, the comparator 504 outputs a signal of Low to a set terminal of the RS-FF circuit 113. When the divided voltage VFB is lower than the reference voltage, the comparator 504 outputs a signal of High to the set terminal of the RS-FF circuit 113. A reset terminal of the RS-FF circuit 113 is supplied with a signal output from the timer circuit 501. An output signal is output from a Q terminal of the RS-FF circuit 113 in accordance with the output signal of the comparator 504 and the output signal of the timer circuit 501. The drive circuit 110 controls on and off of the NMOS transistors 108 and 109 in response to the signal from the RS-FF circuit 113, to thereby generate the output voltage Vout from the output terminal 102 (see, for example, Japanese Patent Application Laid-open No. 2011-182533).

In the related-art DC/DC converter, however, there is a problem in that, when the output voltage increases in a light load state, if control of turning off the output transistor in order to decrease the output voltage is continued, the timer circuit cannot secure a predetermined ON-time required for resuming to a normal operation because of the decreased output voltage, with the result that it takes time for the DC/DC converter to resume to the normal operation. Further, there is a problem in that a large ripple may be generated in the light load state as compared to normal continuous mode control.

SUMMARY OF THE INVENTION

The present invention has been made in view of the above-mentioned problems, and provides a DC/DC converter capable of immediately resuming to a normal operation even when an output voltage increases in a light load state and control of turning off an output transistor is continued.

In order to solve the problem in the related art, a DC/DC converter according to one embodiment of the present invention is configured as follows.

The DC/DC converter includes an ON-timer circuit including: a ripple generation circuit; a smoothing circuit; a timer circuit configured to output an ON-time signal; a logic circuit configured to detect a sign of generation of a reverse current; and a switch circuit configured to, based on a detection signal of the logic circuit, one of maintain an output voltage of the ripple generation circuit and control the output voltage of the ripple generation circuit to a predetermined voltage.

The DC/DC converter according to one embodiment of the present invention maintains the output voltage of the ripple generation circuit or controls the output voltage of the ripple generation circuit to a predetermined voltage during a suspended state. Consequently, there is an effect that the DC/DC converter may smoothly resume from the suspended state to a normal operation.

DETAILED DESCRIPTION OF THE PREFERRED EMBODIMENT

Now, an embodiment of the present invention is described with reference to the accompanying drawings.

Figure 1:
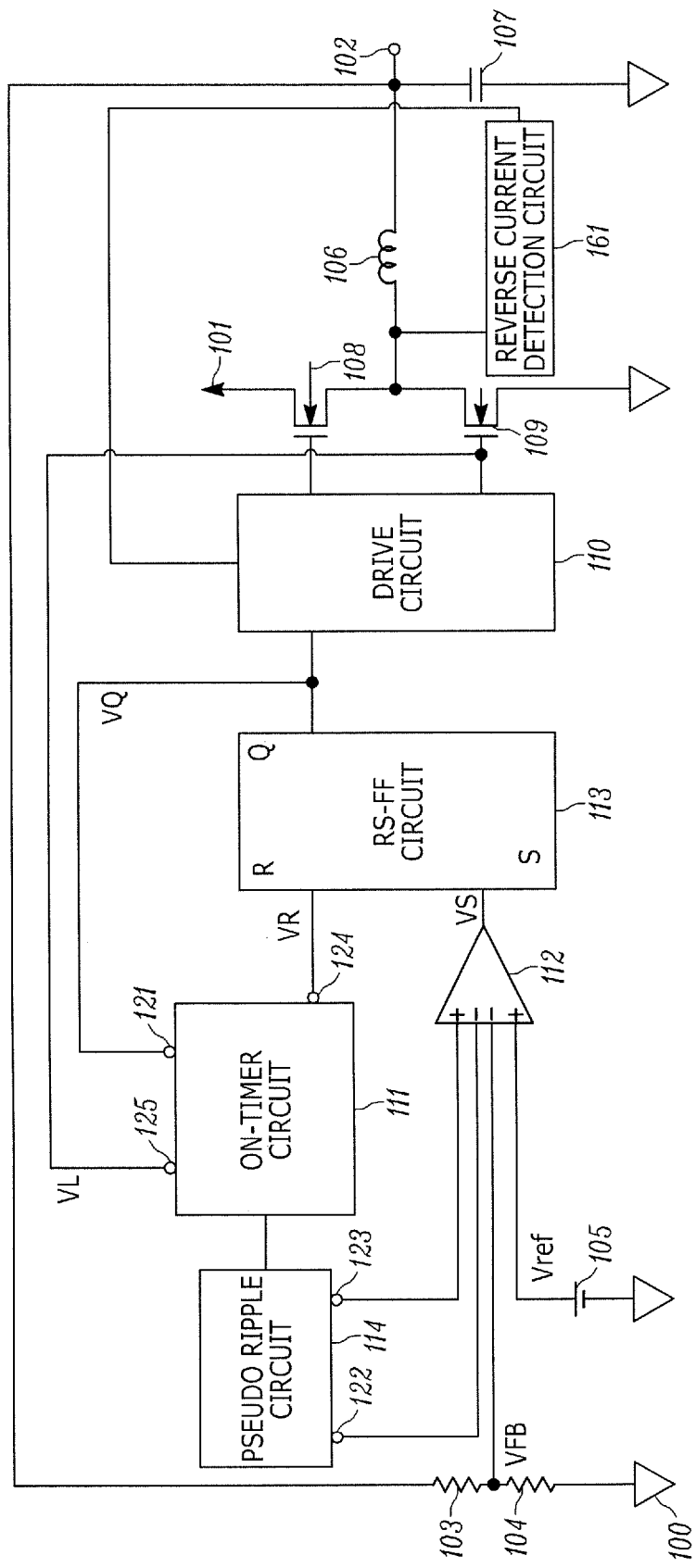
FIG. 1 is a circuit diagram illustrating an example of a DC/DC converter according to an embodiment of the present invention.

FIG. 1 is a circuit diagram illustrating an example of a DC/DC converter according to this embodiment.

The DC/DC converter according to this embodiment includes a comparator 112, an RS-FF circuit 113, a pseudo ripple circuit 114, a drive circuit 110, a reference voltage circuit 105, an ON-timer circuit 111, NMOS transistors 108 and 109, which are output transistors, a reverse current detection circuit 161, a coil 106, a capacitor 107, resistors 103 and 104, a ground terminal 100, a power supply terminal 101, and an output terminal 102.

Figure 2:
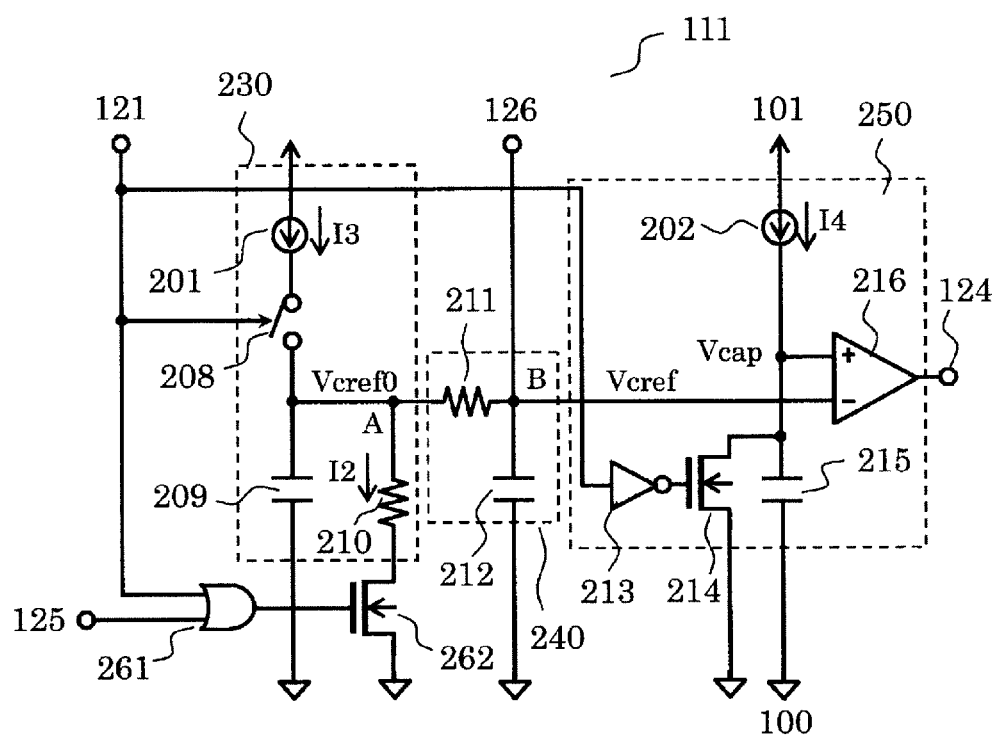
FIG. 2 is a circuit diagram illustrating an example of an ON-timer circuit of the DC/DC converter according to this embodiment.

FIG. 2 is a circuit diagram illustrating an example of the ON-timer circuit 111. The ON-timer circuit 111 includes a ripple generation circuit 230, an averaging circuit 240, a timer circuit 250, an OR circuit 261, an NMOS transistor 262, input terminals 121 and 125, and output terminals 124 and 126. The ripple generation circuit 230 includes a switch circuit 208, a constant current circuit 201, a capacitor 209, and a resistor 210. The averaging circuit 240 includes a resistor 211 and a capacitor 212. The timer circuit 250 includes a constant current circuit 202, an inverter 213, an NMOS transistor 214, a capacitor 215, and a comparator 216.

Figure 3:
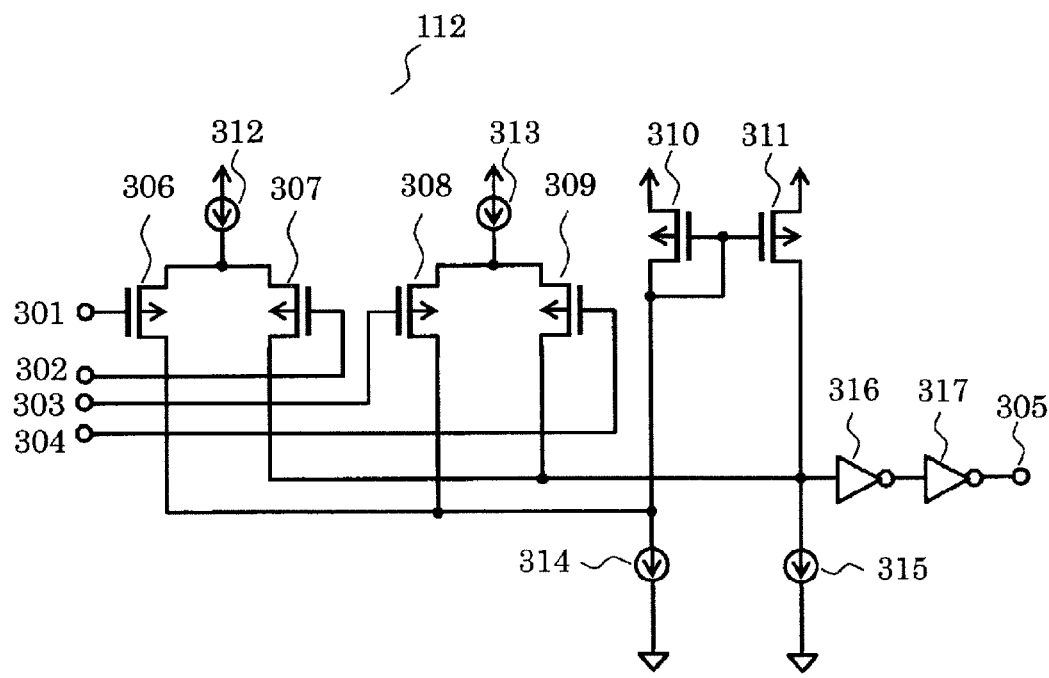
FIG. 3 is a circuit diagram illustrating an example of a configuration of a comparator of the DC/DC converter according to this embodiment.

FIG. 3 is a circuit diagram of the comparator 112. The comparator 112 includes constant current circuits 312, 313, 314, and 315, inverters 316 and 317, PMOS transistors 306, 307, 308, 309, 310, and 311, a first non-inverting input terminal 301, a first inverting input terminal 302, a second non-inverting input terminal 303, a second inverting input terminal 304, and an output terminal 305.

Next, connections in the DC/DC converter according to this embodiment are described.

The comparator 112 has the first inverting input terminal 302 connected to an output terminal 122 of the pseudo ripple circuit 114, the first non-inverting input terminal 301 connected to an output terminal 123 of the pseudo ripple circuit 114, the second inverting input terminal 304 connected to a connection point between one terminal of the resistor 103 and one terminal of the resistor 104, the second non-inverting input terminal 303 connected to a positive electrode of the reference voltage circuit 105, and the output terminal 305 connected to a set (S) terminal of the RS-FF circuit 113. The other terminal of the resistor 103 is connected to the output terminal 102. The other terminal of the resistor 104 is connected to the ground terminal 100. The reference voltage circuit 105 has a negative electrode connected to the ground terminal 100. The RS-FF circuit 113 has a reset (R) terminal connected to the output terminal 124 of the ON-timer circuit 111, and an output terminal connected to a first input terminal of the drive circuit 110 and the input terminal 121 of the ON-timer circuit 111. The NMOS transistor 108 has a gate connected to a first output terminal of the drive circuit 110, a drain connected to the power supply terminal 101, and a source connected to one terminal of the coil 106 and a drain of the NMOS transistor 109. The NMOS transistor 109 has a gate connected to a second output terminal of the drive circuit 110 and the input terminal 125 of the ON-timer circuit 111, and a source connected to the ground terminal 100. The capacitor 107 has one terminal connected to the output terminal 102 and the other terminal of the coil 106. The other terminal of the capacitor 107 is connected to the ground terminal 100. The reverse current detection circuit 161 has an input terminal connected to the drain of the NMOS transistor 109 and an output terminal connected to the second input terminal of the drive circuit 110.

Connections in the ON-timer circuit 111 are now described. The constant current circuit 201 has one terminal connected to the power supply terminal 101 and the other terminal connected to one terminal of the switch circuit 208. The capacitor 209 has one terminal connected to the other terminal of the switch circuit 208 and the node A, and the other terminal connected to the ground terminal 100. The resistor 210 has one terminal connected to the node A. The resistor 211 has one terminal connected to the node A and the other terminal connected to the output terminal 126 and a node B. The NMOS transistor 262 has a gate connected to an output terminal of the OR circuit 261, a drain connected to the other terminal of the resistor 210, and a source connected to the ground terminal 100. The OR circuit 261 has a first input terminal connected to the input terminal 121 and a second input terminal connected to the input terminal 125. The capacitor 212 has one terminal connected to the node B and the other terminal connected to the ground terminal 100. The inverter 213 has an input terminal connected to the input terminal 121 and a control terminal of the switch circuit 208, and an output terminal connected to a gate of the NMOS transistor 214. The NMOS transistor 214 has a drain connected to one terminal of the capacitor 215 and one terminal of the constant current circuit 202, and a source connected to the ground terminal 100. The other terminal of the capacitor 215 is connected to the ground terminal 100. The other terminal of the constant current circuit 202 is connected to the power supply terminal 101. The comparator 216 has a non-inverting input terminal connected to the one terminal of the capacitor 215, an inverting input terminal connected to the node B, and an output terminal connected to the output terminal 124.

Connections in the comparator 112 are now described. The constant current circuit 312 has one terminal connected to the power supply terminal 101 and the other terminal connected to a source of the PMOS transistor 306 and a source of the PMOS transistor 307. The PMOS transistor 306 has a gate connected to the first non-inverting input terminal 301, and a drain connected to a connection point between one terminal of the constant current circuit 314 and a gate and a drain of the PMOS transistor 310. The PMOS transistor 307 has a gate connected to the first inverting input terminal 302 and a drain connected to an input terminal of the inverter 316. The constant current circuit 313 has one terminal connected to the power supply terminal 101 and the other terminal connected to a source of the PMOS transistor 308 and a source of the PMOS transistor 309. The PMOS transistor 308 has a gate connected to the second non-inverting input terminal 303, and a drain connected to the connection point between the one terminal of the constant current circuit 314 and the gate and the drain of the PMOS transistor 310. The PMOS transistor 309 has a gate connected to the second inverting input terminal 304 and a drain connected to the input terminal of the inverter 316. The PMOS transistor 310 has a source connected to the power supply terminal 101. The other terminal of the constant current circuit 314 is connected to the ground terminal 100. The PMOS transistor 311 has a gate connected to the gate of the PMOS transistor 310, a drain connected to the input terminal of the inverter 316, and a source connected to the power supply terminal 101. The constant current circuit 315 has one terminal connected to the input terminal of the inverter 316 and the other terminal connected to the ground terminal 100. The inverter 317 has an input terminal connected to an output terminal of the inverter 316 and an output terminal connected to the output terminal 305.

Next, an operation of the DC/DC converter according to this embodiment is described.

When a power supply voltage VDD is input to the power supply terminal 101, the DC/DC converter outputs an output voltage Vout from the output terminal 102. The resistors 103 and 104 divide the output voltage Vout to output a divided voltage VFB. The comparator 112 has a four-terminal input configuration as illustrated in FIG. 3. The comparator 112 compares a reference voltage Vref of the reference voltage circuit 105, which is input to the second non-inverting input terminal, the divided voltage VFB input to the second inverting input terminal, a voltage output from the output terminal 122 of the pseudo ripple circuit 114, which is input to the first inverting input terminal, and a voltage output from the output terminal 123 of the pseudo ripple circuit 114, which is input to the first non-inverting input terminal, and outputs a signal VS from the output terminal of the comparator 112. A signal output from the output terminal 124 of the ON-timer circuit 111 is referred to as "ON-time signal VR", a signal output from a Q terminal of the RS-FF circuit 113 is referred to as "signal VQ", and a signal output from the second output terminal of the drive circuit 110 is referred to as "signal VL".

Figure 4:
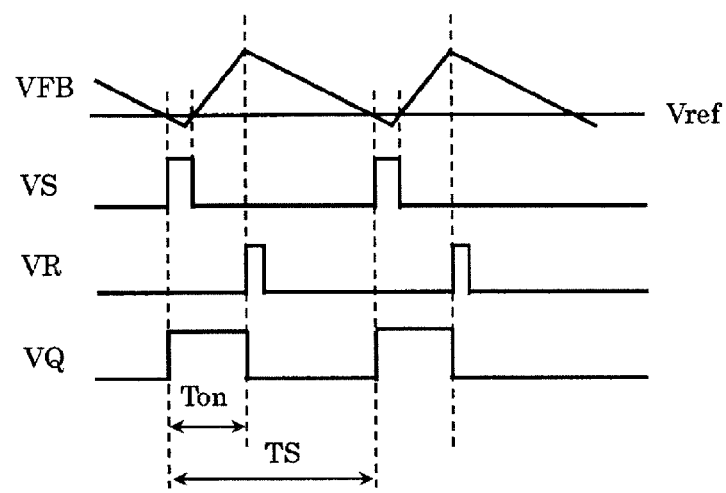
FIG. 4 is a timing chart illustrating an operation of the DC/DC converter according to this embodiment.

FIG. 4 is a timing chart illustrating a temporal change in voltage at each of the nodes. When the voltage VFB falls below the reference voltage Vref, the signal VS becomes High to set the signal VQ of the Q terminal of the RS-FF circuit 113 to High. Then, the signal VQ is input to the drive circuit 110, and the NMOS transistor 108 is turned on while the NMOS transistor 109 is turned off in accordance with the signal VQ, to thereby increase the divided voltage VFB (output voltage Vout). When the ON-time signal VR (output voltage Vout) from the output terminal 124 of the ON-timer circuit 111 becomes High, the signal VQ becomes Low by the RS-FF circuit 113, and the NMOS transistor 108 is turned off while the NMOS transistor 109 is turned on, to thereby decrease the divided voltage VFB (output voltage Vout). A time period during which the signal VQ is High is represented by "Ton", and a time period from when the signal VQ becomes High to when the signal VQ becomes High again is represented by "TS". The output voltage Vout is generated from the output terminal 102 through control of the NMOS transistor 108 and the NMOS transistor 109 that serve as output transistors in accordance with a cycle of the time period TS.

In the comparator 112, the voltage output from the output terminal 122 of the pseudo ripple circuit 114 is input to the first inverting input terminal thereof, and is accordingly added to the divided voltage VFB input to the second inverting input terminal in the comparator 112. In this manner, the divided voltage VFB becomes a voltage containing a ripple component. Then, the voltage output from the output terminal 123 of the pseudo ripple circuit 114 is input to the first non-inverting input terminal of the comparator 112, and is accordingly added to the reference voltage Vref input to the second non-inverting input terminal in the comparator 112. Those two added signals are compared to each other, and the signal VS is output from the comparator 112.

A current flowing through the constant current circuit 201 included in the ON-timer circuit 111 is represented by "I3", a current flowing through the constant current circuit 202 is represented by "I4", and a current flowing through the resistor 210 is represented by "I2". When a resistance value of the resistor 210 is represented by "R2" and a voltage of the node A is represented by "Vcref0", the current I2 is expressed as I2=Vcref0/R2. The switch circuit 208 is controlled by the signal VQ. When the signal VQ is High, the switch circuit 208 is turned on, and the capacitor 209 is charged with the current I3 and discharged with the current I2. Further, when the signal VQ is Low, the switch circuit 208 is turned off, and electric charges of the capacitor 209 are discharged with the current I2. The signal VQ and the signal VL are opposite in phase. Accordingly, when the signal VQ is High, the signal VL is Low, and when the signal VL is High, the signal VQ is Low. In a normal operation, the OR circuit 261 always outputs High to turn on the NMOS transistor 262. When an electric charge amount in charging is represented by "Q1" and an electric charge amount in discharging is represented by "Q2", the electric charge amounts are expressed as Q1=I3×Ton and Q2=I2×TS. Because Q1=Q2 is established, I3×Ton=I2×TS is established and Ton/TS=I2/I3=Vout/VDD is established. Accordingly, Vout=VDD×I2/I3 is established.

Because I2=Vcref0/R2 is established, Vout=VDD×Vcref0/R2/I3 is established and Vcref0=Vout/VDD×R2×I3 is established. Accordingly, the voltage Veref0 can be regarded as a voltage that is proportional to the output voltage Vout, and contains a ripple component of the output voltage Vout. An output voltage of the averaging circuit 240, that is, the voltage Vcref of the node B is obtained by removing the ripple component by averaging the voltage Vcref0 with the resistor 211 and the capacitor 212. Accordingly, the voltage Vcref is a voltage which is proportional to the output voltage Vout and from which a ripple component is removed, that is, Vcref=Vout/VDD×R2×I3 is established.

The NMOS transistor 214 is controlled to be turned on and off by a signal obtained by inverting the signal VQ. A voltage of the non-inverting input terminal of the comparator 216 is represented by "Vcap". When the NMOS transistor 214 is turned off, the capacitor 215 is charged with the current I4 to increase the voltage Vcap. The comparator 216 outputs the ON-time signal VR of Low to the output terminal 124 when the voltage Vcap is lower than the voltage Vcref, and outputs the ON-time signal VR of High to the output terminal 124 when the voltage Vcap is higher than the voltage Vcref. Then, the signal VQ becomes Low by the RS-FF circuit 113 so that the NMOS transistor 214 is turned on to discharge the electric charges of the capacitor 215, to thereby decrease the voltage Vcap.

When a capacitance value of the capacitor 215 is represented by "C2", the ON-time Ton is expressed as Ton=C2/I4×Vcref=C2×I3/I4×R2×Vout/VDD, and hence the ON-time Ton can be controlled by the duty ratio expressed by Vout/VDD.

In a light load state in which a reverse current is generated in the coil 106, the reverse current detection circuit 161 detects the reverse current of the coil 106 based on a drain voltage of the NMOS transistor 109, and outputs a detection signal to the second input terminal of the drive circuit 110. When the detection signal is received, the drive circuit 110 controls the NMOS transistors 108 and 109 to be turned off. This state is referred to as "suspended state". In the suspended state, the signal VQ and the signal VL become Low to turn off the switch circuit 208 and the NMOS transistor 262. With this, the charge from the constant current circuit 201 to the capacitor 209 and the discharge from the capacitor 209 to the resistor 210 are stopped, and hence the voltage Vcref0 is maintained without being deviated from a desired voltage during the suspended state. In resuming from the suspended state, because the voltage Vcref0 and the voltage Vcref maintain the state before the suspended state, the comparator 216 can smoothly output a signal from the output terminal 124 to restart the switching operation. In this manner, the discharge and charge of the capacitor 209 are stopped so as to maintain the voltage Vcref0 during the suspended state, and hence after resuming from the suspended state, the timer circuit 250 can smoothly operate to smoothly restart the switching operation.

Note that, the reverse current detection circuit 161 is configured to detect the reverse current of the coil 106 based on the drain voltage of the NMOS transistor 109, but may detect that the current of the coil 106 becomes zero. Further, the signal of the Q terminal of the RS-FF circuit 113 is used as the signal VQ, but a signal at another node may be used as long as the signal is synchronized with the signal to be input to the gate of the NMOS transistor 108. Further, the NMOS transistor 262 is used as the element for stopping the discharge of the capacitor 209 during the suspended state, but the configuration is not limited thereto, and a switch circuit or the like may be used.

As described above, the DC/DC converter according to this embodiment maintains the output voltage of the ripple generation circuit during the suspended state, thereby being capable of smoothly operating the timer circuit at the time of resuming from the suspended state so as to smoothly restart the switching operation.

Figure 5:
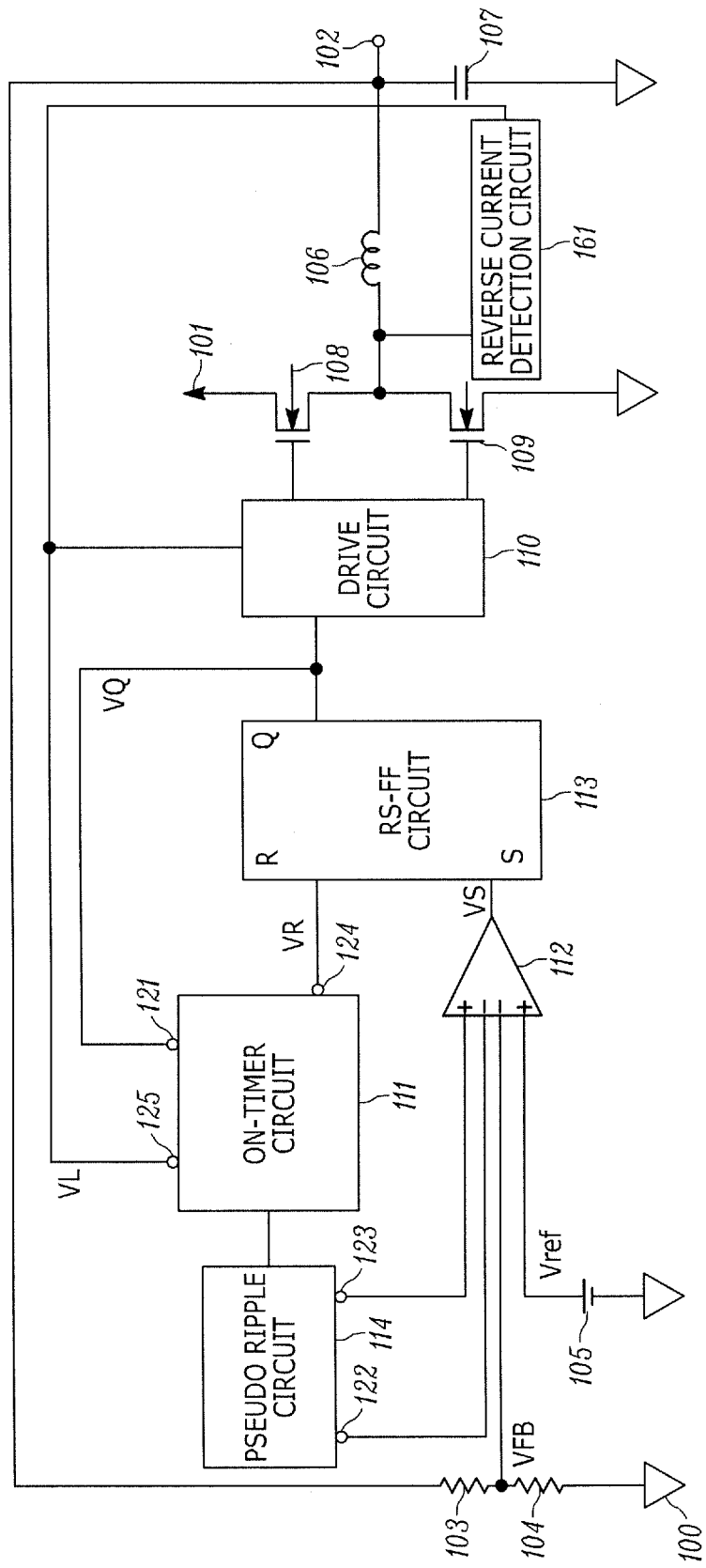
FIG. 5 is a circuit diagram illustrating another example of the DC/DC converter according to this embodiment.
Figure 6:
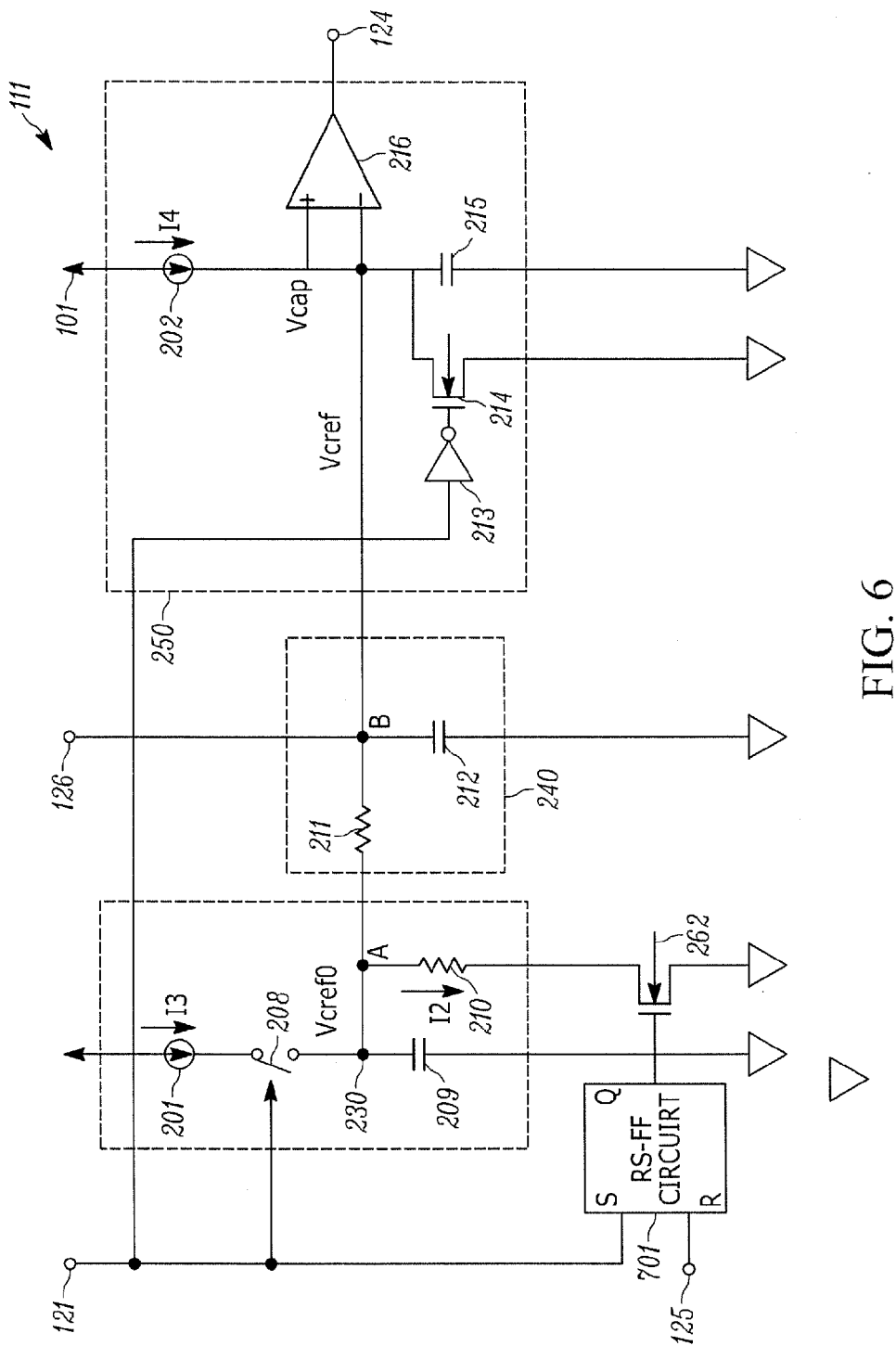
FIG. 6 is a circuit diagram illustrating another example of the ON-timer circuit of the DC/DC converter according to this embodiment.

FIG. 5 is a circuit diagram illustrating another example of the DC/DC converter according to this embodiment. The difference from FIG. 1 resides in that the signal to be input to the input terminal 125 of the ON-timer circuit 111 is the detection signal of the reverse current detection circuit 161. The other circuit configurations and connections are the same as those in the circuit of FIG. 1. FIG. 6 is a circuit diagram illustrating another example of the ON-timer circuit of the DC/DC converter according to this embodiment. The difference from FIG. 2 resides in that the OR circuit 261 is changed to an RS-FF circuit 701. The RS-FF circuit 701 has a reset terminal connected to the input terminal 125, a set terminal connected to the input terminal 121, and an output terminal connected to the gate of the NMOS transistor 262. The other circuit configurations and connections are the same as those in the circuit of FIG. 2.

An operation of the DC/DC converter of FIG. 5 is now described. The power supply voltage VDD is input to the power supply terminal 101, and the output voltage Vout of the output terminal 102 is controlled to be constant. This operation is the same as in the first embodiment.

In the light load state in which a reverse current is generated in the coil 106, the reverse current detection circuit 161 detects the reverse current of the coil 106 based on the drain voltage of the NMOS transistor 109, and outputs the detection signal to the second input terminal of the drive circuit 110. When the detection signal is received, the drive circuit 110 controls the NMOS transistors 108 and 109 to be turned off. This state is referred to as "suspended state". In the suspended state, the signal VQ becomes Low to turn off the switch circuit 208, and Low is input to the set terminal of the RS-FF circuit 701. The output of the reverse current detection circuit 161 is High, and hence Low is output from the output terminal of the RS-FF circuit 701 to turn off the NMOS transistor 262. With this, the charge from the constant current circuit 201 to the capacitor 209 and the discharge from the capacitor 209 to the resistor 210 are stopped, and hence the voltage Vcref0 is maintained without being deviated from a desired voltage during the suspended state. In resuming from the suspended state, because the voltage Vcref0 and the voltage Vcref maintain the state before the suspended state, the comparator 216 can smoothly output a signal from the output terminal 124 to restart the switching operation. In this manner, the discharge and charge of the capacitor 209 are stopped so as to maintain the voltage Vcref0 during the suspended state, and hence after resuming from the suspended state, the timer circuit 250 can smoothly operate to smoothly restart the switching operation.

Note that, the reverse current detection circuit 161 is configured to detect the reverse current of the coil 106 based on the drain voltage of the NMOS transistor 109, but may detect that the current of the coil 106 becomes zero. Further, the signal of the Q terminal of the RS-FF circuit 113 is used as the signal VQ, but a signal at another node may be used as long as the signal is synchronized with the signal to be input to the gate of the NMOS transistor 108. Further, the RS-FF circuit is used as the circuit for turning off the NMOS transistor 262, but the configuration is not limited thereto, and any circuit that can turn off the NMOS transistor 262 may be used. Further, the NMOS transistor 262 is used as the element for stopping the discharge of the capacitor 209 during the suspended state, but the configuration is not limited thereto, and a switch circuit or the like may be used.

As described above, the DC/DC converter of FIG. 5 maintains the output voltage of the ripple generation circuit during the suspended state, thereby being capable of smoothly operating the timer circuit at the time of resuming from the suspended state so as to smoothly restart the switching operation.

In the DC/DC converter of FIG. 5, the signal to be input to the input terminal 125 of the ON-timer circuit 111 is the detection signal of the reverse current detection circuit 161. With this configuration, even in a DC/DC converter that uses a diode instead of the NMOS transistor 109, the same effects can be obtained. In this case, the reverse current detection circuit 161 is configured to detect that no current flows through the coil 106.

Figure 7:
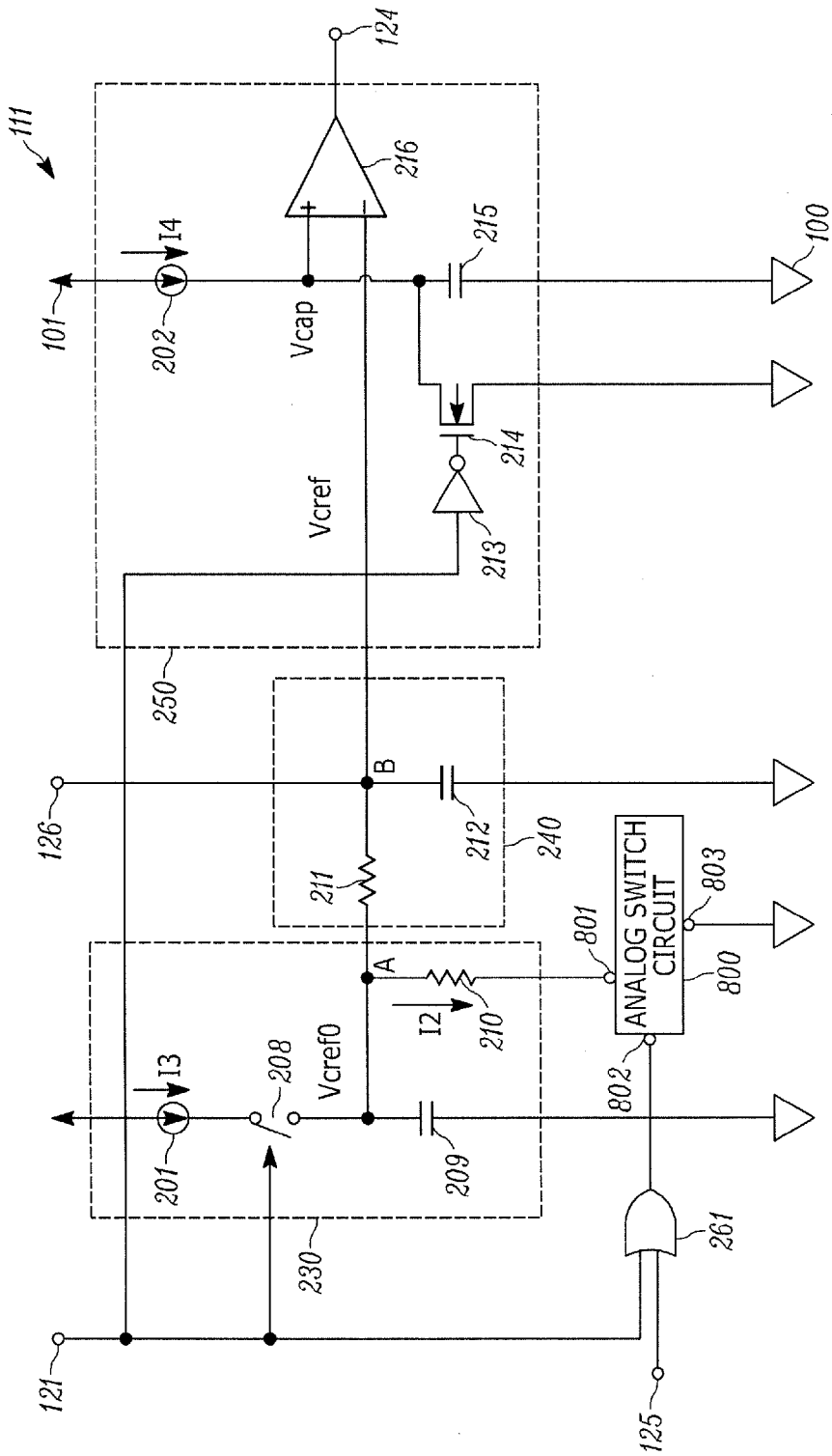
FIG. 7 is a circuit diagram illustrating still another example of the ON-timer circuit of the DC/DC converter according to this embodiment.

FIG. 7 is a circuit diagram illustrating still another example of the ON-timer circuit of the DC/DC converter according to this embodiment. The difference from FIG. 2 resides in that the NMOS transistor 262 is changed to an analog switch circuit 800.

Figure 8:
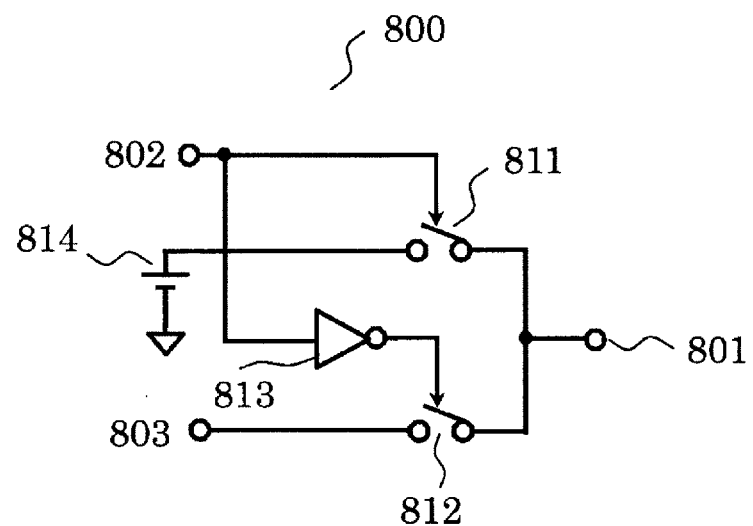
FIG. 8 is a circuit diagram illustrating an example of an analog switch circuit included in the ON-timer circuit of FIG. 7.

FIG. 8 is a circuit diagram illustrating an example of the analog switch circuit 800. The analog switch circuit 800 includes switch circuits 811 and 812, an inverter 813, a constant voltage circuit 814, input terminals 802 and 803, and an output terminal 801.

The analog switch circuit 800 has the input terminal 802 connected to the output terminal of the OR circuit 261, the input terminal 803 connected to the ground terminal 100, and the output terminal 801 connected to the resistor 210. The inverter 813 has an input terminal connected to the input terminal 802 and a control terminal of the switch circuit 811, and an output terminal connected to a control terminal of the switch circuit 812. The switch circuit 811 has one terminal connected to a positive electrode of the constant voltage circuit 814 and the other terminal connected to the output terminal 801. The switch circuit 812 has one terminal connected to the input terminal 803 and the other terminal connected to the output terminal 801. The constant voltage circuit 814 has a negative electrode connected to the ground terminal 100.

The other circuit configurations and connection relationships are the same as those of FIG. 2.

An operation of the DC/DC converter according to this embodiment including the ON-timer circuit of FIG. 7 is now described. The power supply voltage VDD is input to the power supply terminal 101, and the output voltage Vout of the output terminal 102 is controlled to be constant. This operation is the same as in the circuit of FIG. 1.

Figure 9:
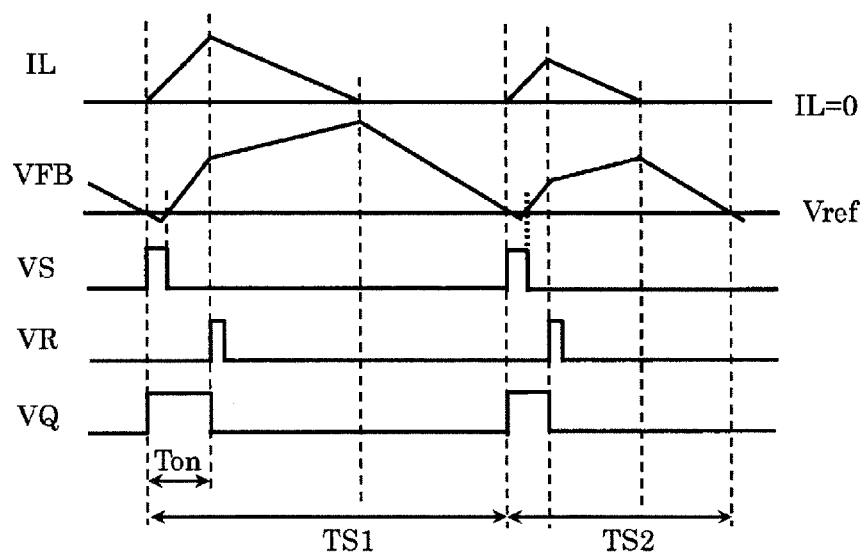
FIG. 9 is a timing chart illustrating an operation of the DC/DC converter according to this embodiment in a light load state.

FIG. 9 is a timing chart illustrating a change in voltage at each node when the DC/DC converter operates with a light load. IL represents a coil current. In FIG. 9, a timing chart of the ON-timer circuits of FIG. 2 and FIG. 6 is illustrated in the first one cycle (TS1), and a timing chart of the ON-timer circuit of FIG. 7 is illustrated in the next one cycle (TS2).

In the operation in the light load state, a ripple is larger than that in a normal state in which the DC/DC converter operates in a continuous mode (TS1). However, the ripple can be reduced by the circuit configuration as illustrated in FIG. 7 (TS2).

In the light load state, when the output voltage Vout decreases so that the divided voltage VFB falls below the reference voltage Vref, the comparator 112 outputs a signal of High to turn on the NMOS transistor 108 and off the NMOS transistor 109 via the drive circuit 110, to thereby increase the output voltage Vout. The divided voltage VFB also increases along with the increase in output voltage Vout. After a predetermined time period has elapsed, a signal of High is output from the output terminal of the timer circuit 250 included in the ON-timer circuit 111, and the NMOS transistor 108 is turned off while the NMOS transistor 109 is turned on via the drive circuit 110.

After the NMOS transistor 108 is turned off, the coil current IL flows to the output terminal 102 to further increase the output voltage Vout due to energy stored in the coil 106. Then, when the energy of the coil 106 decreases so that the coil current IL becomes zero, the reverse current detection circuit 161 detects a reverse current based on the drain voltage of the NMOS transistor 109, and outputs a detection signal. When the detection signal is input to the drive circuit 110, the drive circuit 110 turns off the NMOS transistor 109.

After that, the output voltage Vout gradually decreases, and the divided voltage VFB falls below the reference voltage Vref. Then, the comparator 112 outputs a signal of High to turn on the NMOS transistor 108 and off the NMOS transistor 109 via the drive circuit 110, to thereby increase the output voltage Vout. This operation is repeated to control the output voltage Vout to be constant.

The state in which the reverse current detection circuit 161 detects the reverse current and outputs the signal to the drive circuit 110 so as to control the NMOS transistors 108 and 109 to be turned off is referred to as "suspended state". In the suspended state, the signal VQ becomes Low to turn off the switch circuits 208 and 812 and turn on the switch circuit 811, to thereby set the voltage Vcref0 to a voltage V1 that is output from the constant voltage circuit 814. In the control in the light load state, the output voltage Vout continues increasing until the coil current IL becomes zero since the NMOS transistor 108 was turned off, and hence the ripple is larger than that in the normal state controlled in the continuous mode. In order to suppress the increase in ripple, the constant voltage circuit 814 decreases the voltage Vcref0 and the voltage Vcref to the voltage V1 in the suspended state. When the divided voltage VFB falls below the reference voltage Vref, the comparator 112 outputs a signal of High to turn on the NMOS transistor 108 and off the NMOS transistor 109 via the drive circuit 110, to thereby increase the coil current IL. The reverse current detection circuit 161 detects the release of the reverse flow of the coil current IL, and turns on the switch circuits 208 and 812 and off the switch circuit 811, to thereby increase the voltage Vcref0 from the voltage V1. The voltage Vcref does not immediately increase due to the smoothing circuit 240, but is maintained at the voltage V1 so as to control the ON-time Ton to be shortened. Because the ON-time Ton is short, an increment of the coil current IL and an increment of the output voltage are decreased, and hence the increase in ripple voltage can be suppressed. Further, the voltage Vcref is maintained at the state closer to the state before the suspended state, and hence the comparator 216 can smoothly output a signal from the output terminal 124 to restart the switching operation.

Note that, the magnitude of the ripple voltage can be controlled to be small through the adjustment of the voltage V1, but if the magnitude of the ripple voltage is excessively reduced, it is difficult for the comparator 216 to smoothly output a signal from the output terminal 124. For this reason, the magnitude of the ripple voltage needs to be adjusted to an optimal value so that the ripple may be small and the comparator 216 may smoothly operate. Further, the signal of the Q terminal of the RS-FF circuit 113 is used as the signal VQ, but a signal at another node may be used as long as the signal is synchronized with the signal to be input to the gate of the NMOS transistor 108. Further, the OR circuit is used as the circuit for controlling the analog switch circuit 800, but the configuration is not limited thereto, and any circuit that can control the analog switch circuit 800 may be used.

As described above, the DC/DC converter according to this embodiment including the ON-timer circuit of FIG. 7 controls the output voltage of the ripple generation circuit to a predetermined voltage during the suspended state, thereby being capable of smoothly operating the timer circuit at the time of resuming from the suspended state, and smoothly restarting the switching operation. Further, the ripple voltage in the light load state can be reduced.

Figure 10:
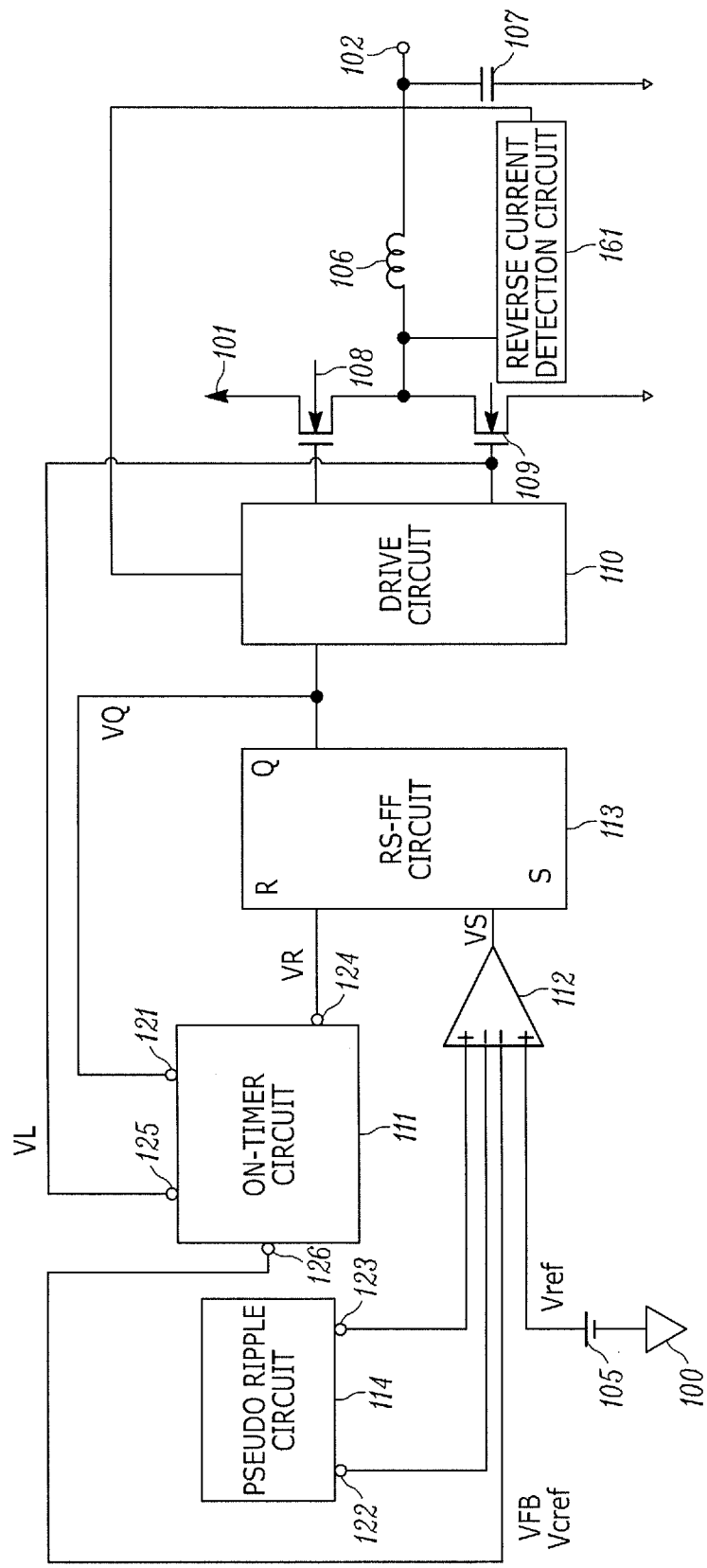
FIG. 10 is a circuit diagram illustrating still another example of the DC/DC converter according to this embodiment.
Figure 11:
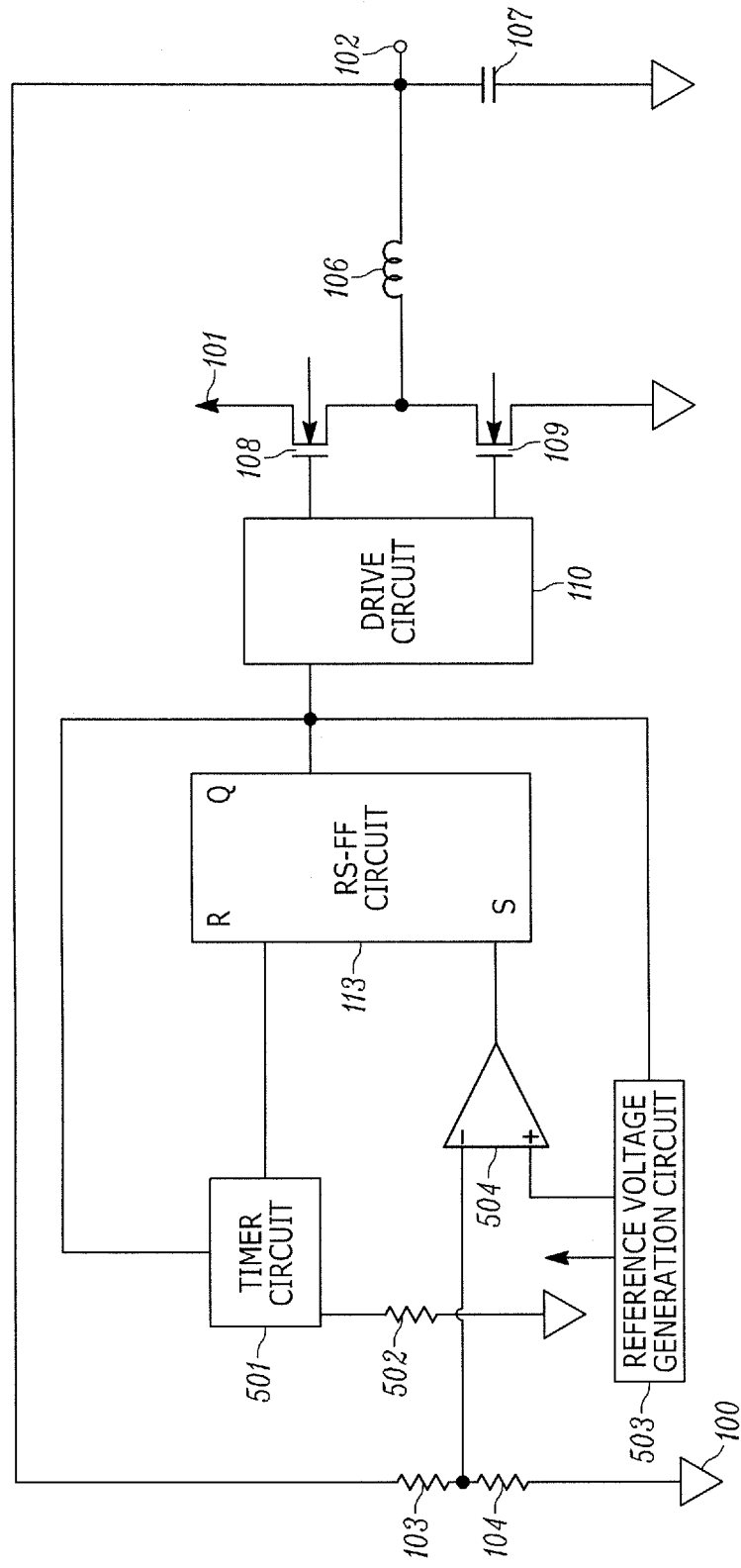
FIG. 11 is a circuit diagram illustrating a configuration of a related-art DC/DC converter.

FIG. 10 is a circuit diagram illustrating another example of the DC/DC converter according to this embodiment. The difference from the DC/DC converter according to the embodiment of FIG. 1 resides in that the voltage Vcref is output from the output terminal 125 of the ON-timer circuit 111 and input to the second inverting input terminal of the comparator 112 so that the resistors 103 and 104 configured to divide the output voltage Vout are removed.

An operation of the DC/DC converter of FIG. 10 is described.

When the power supply voltage VDD is input to the power supply terminal 101, the DC/DC converter outputs the output voltage Vout from the output terminal 102. The comparator 112 has a four-terminal input configuration as illustrated in FIG. 3. The comparator 112 compares the reference voltage Vref of the reference voltage circuit 105, which is input to the second non-inverting input terminal, the voltage Vcref output from the ON-timer circuit 111, which is input to the second inverting input terminal, the voltage output from the output terminal 122 of the pseudo ripple circuit 114, which is input to the first inverting input terminal, and the voltage output from the output terminal 123 of the pseudo ripple circuit 114, which is input to the first non-inverting input terminal, and outputs the signal VS from the output terminal of the comparator 112. The ON-timer circuit 111 inputs the signal VQ from the input terminal 121, inputs the signal VL from the input terminal 125, outputs the ON-time signal VR from the output terminal 124, and outputs the voltage Vcref from the output terminal 126. The RS-FF circuit 113 inputs the ON-time signal VR from the R terminal, inputs the signal VS from the S terminal, and outputs the signal VQ from the Q terminal. The drive circuit 110 outputs the signal VL from the second output terminal.

In the ON-timer circuit 111 according to this embodiment, the averaging circuit 240 generates an averaged voltage Vcref proportional to the output voltage Vout without directly using the output voltage Vout. The output voltage Vcref of the averaging circuit 240 is Vcref=Vout/VDD×R2×I1, where I1=VDD×K. Accordingly, Vcref=Vout/VDD×R2λVDD×K is established and Vcref=Vout×R2×K is established. Thus, the output voltage Vcref and the output voltage Vout have a proportional relationship, and Vout=Vcref×R2×K is established. Consequently, a desired output voltage Vout can be obtained through the control of the output voltage Vcref.

When the output voltage Vcref of the averaging circuit 240 falls below the reference voltage Vref, the signal VS becomes High to set the signal VQ of the Q terminal of the RS-FF circuit 113 to High. Then, the signal VQ is input to the drive circuit 110, and the NMOS transistor 108 is turned on while the NMOS transistor 109 is turned off in accordance with the signal VQ, to thereby increase the output voltage Vout. When the ON-time signal VR output from the output terminal 124 of the ON-timer circuit 111 becomes High, the signal VQ becomes Low by the RS-FF circuit 113, and the NMOS transistor 108 is turned off while the NMOS transistor 109 is turned on, to thereby decrease the output voltage Vout. A time period during which the signal VQ is High is represented by "Ton", and a time period from when the signal VQ becomes High to when the signal VQ becomes High again is represented by "TS". The output voltage Vout is generated from the output terminal 102 through control of the NMOS transistor 108 and the NMOS transistor 109 that serve as output transistors in accordance with a cycle of the time period TS.

As described above, the DC/DC converter according to this embodiment is capable of operating the timer circuit without directly using the output voltage Vout, and hence the shift of the ON-time and a malfunction due to noise of the output voltage Vout can be prevented to achieve stable control. Further, the ON-time signal can be controlled by the duty ratio, and hence the DC/DC converter is capable of operating at a constant operating frequency even when input and output conditions are changed.

Note that, the DC/DC converter and the ON-timer circuit according to this embodiment are not limited to the combinations described in this embodiment. In other words, the same effects can be obtained by any combination of the DC/DC converters of FIG. 2, FIG. 5, and FIG. 10 and the ON-timer circuits of FIG. 2, FIG. 6, and FIG. 7.

Further, in the control of the DC/DC converter according to this embodiment, in order to keep the output voltage Vout constant, the relationship of the power supply voltage VDD and the duty is set so that Vout=VDD×duty is established. As long as the DC/DC converter performs such control, the output voltage Vout can be controlled by the ON-timer circuit having the configuration according to this embodiment. For example, a forward DC/DC converter is exemplified.

In the forward DC/DC converter, control is performed based on Vout=VDD×duty×Ns/Np, where Vout represents the output voltage, VDD represents the power supply voltage, Np represents a primary-side winding of a coil as a load, Ns represents a secondary-side winding of the coil as the load. Because Ns/Np is a fixed constant, the output voltage Vout is controlled by the same duty ratio as that of the DC/DC converter having the configuration according to this embodiment. In particular, in the case of Ns=Np, the same control is performed as that of the DC/DC converter having the configuration according to this embodiment.

In the configuration of a general forward DC/DC converter, a switch element is connected to a ground terminal, and when the switch element is turned on and off, the switch element controls a current flowing through the coil as the load, to thereby control the output voltage Vout. A control terminal for turning on and off the switch element is connected to a drive circuit. By inputting the output signal VQ of the RS-FF circuit having the configuration according to this embodiment to the drive circuit, the output voltage Vout can be generated.

As described above, the ON-timer circuit having the configuration according to this embodiment is not limited to be used for the DC/DC converter having the configuration according to this embodiment, and may be used for a DC/DC converter having another configuration.

Further, the DC/DC converter of the present invention has been described as including the pseudo ripple circuit 114, but may have a configuration in which the voltage Vcref0 of the ripple generation circuit 230 is input to the first inverting input terminal of the comparator 112 and the voltage Vcref of the averaging circuit 240 is input to the first non-inverting input terminal. When the DC/DC converter is configured in this manner, the same effects can be obtained even without the pseudo ripple circuit 114.

What is claimed is:

1. A DC/DC converter, comprising:
   a comparator configured to output a signal indicating a result of comparison between a voltage obtained by adding a pseudo ripple component corresponding to an output voltage of the DC/DC converter and a voltage corresponding to the output voltage to each other, and a voltage obtained by adding the pseudo ripple component and a reference voltage to each other;
   an ON-timer circuit configured to input a control signal, which is synchronized with a signal input to a gate of an output transistor, and output an ON-time signal;
   a flip-flop circuit configured to input the ON-time signal of the ON-timer circuit and the output signal of the comparator;
   a drive circuit configured to input an output signal of the flip-flop circuit to control the output transistor; and
   a reverse current detection circuit configured to detect a sign that an output current flows reversely from an output terminal so as to output a detection signal to the drive circuit,
   the ON-timer circuit comprising:
   a ripple generation circuit configured to generate and output a ripple component based on the control signal;
   an averaging circuit configured to output a voltage obtained by averaging the ripple component;
   a timer circuit configured to generate and output the ON-time signal based on the voltage output from the averaging circuit and the control signal;
   a logic circuit configured to input the control signal; and
   a switch circuit configured to input an output signal of the logic circuit to control an output voltage of the ripple generation circuit to be maintained when the sign that the output current flows reversely is detected, the switch circuit being connected between an output terminal of the ripple generation circuit and a ground terminal.

2. A DC/DC converter according to claim 1,
   wherein the output transistor comprises a first output transistor and a second output transistor, and
   wherein the control signal to be input to the logic circuit comprises a first control signal, which is synchronized with a signal input to a gate of the first output transistor, and a second control signal, which is synchronized with a signal input to a gate of the second output transistor.

3. A DC/DC converter according to claim 1, wherein the control signal to be input to the logic circuit comprises a first control signal, which is synchronized with the signal input to the gate of the output transistor, and a second control signal, which is synchronized with the detection signal output from the reverse current detection circuit.

4. The DC/DC converter according to claim 1, wherein the switch circuit comprises:
   a constant voltage circuit configured to output a predetermined voltage;
   a first switch including one terminal connected to the constant voltage circuit and another terminal connected to the output terminal of the ripple generation circuit, the first switch being configured to be controlled by the output signal of the logic circuit; and
   a second switch including one terminal connected to the ground terminal and another terminal connected to the output terminal of the ripple generation circuit, the second switch being configured to be controlled by a signal obtained by inverting the output signal of the logic circuit, and
   wherein, when the sign that the output current flows reversely from the output terminal is detected, the first switch is turned on to control a voltage of the output terminal of the ripple generation circuit to the predetermined voltage.

5. A DC/DC converter according to claim 1, wherein the voltage corresponding to the output voltage, which is input to the comparator, comprises an output voltage of the averaging circuit.

* * * * *